United States Patent
Saito et al.

(10) Patent No.: US 12,025,794 B2
(45) Date of Patent: Jul. 2, 2024

(54) INFORMATION PROCESSING DEVICE AND IMAGE PROCESSING METHOD

(71) Applicant: SONY GROUP CORPORATION, Tokyo (JP)

(72) Inventors: Mari Saito, Tokyo (JP); Kenji Sugihara, Tokyo (JP); Soichiro Inatani, Tokyo (JP)

(73) Assignee: SONY GROUP CORPORATION, Tokyo (JP)

(\*) Notice: Subject to any disclaimer, the term of this patent is extended or adjusted under 35 U.S.C. 154(b) by 0 days.

(21) Appl. No.: 17/310,884

(22) PCT Filed: Feb. 7, 2020

(86) PCT No.: PCT/JP2020/004802
§ 371 (c)(1),
(2) Date: Aug. 27, 2021

(87) PCT Pub. No.: WO2020/184021
PCT Pub. Date: Sep. 17, 2020

(65) Prior Publication Data
US 2022/0146821 A1 May 12, 2022

(30) Foreign Application Priority Data
Mar. 12, 2019 (JP) .................. 2019-045082

(51) Int. Cl.
*G02B 27/00* (2006.01)
*G02B 27/01* (2006.01)
(Continued)

(52) U.S. Cl.
CPC ..... *G02B 27/0093* (2013.01); *G02B 27/0075* (2013.01); *G02B 27/017* (2013.01);
(Continued)

(58) Field of Classification Search
CPC ............ G02B 27/0093; G02B 27/0075; G02B 27/017; G02B 2027/0138; G06F 3/013;
(Continued)

(56) References Cited

U.S. PATENT DOCUMENTS 9,964,766 B2 \* 5/2018 Kon ........................ G06F 3/011
10,025,376 B2 \* 7/2018 Shanware .............. G02B 27/01
(Continued)

FOREIGN PATENT DOCUMENTS

| CN | 105474302 A | 4/2016 |
|---|---|---|
| CN | 105519097 A | 4/2016 |

(Continued)

OTHER PUBLICATIONS

International Search Report and Written Opinion of PCT Application No. PCT/JP2020/004802, dated Apr. 21, 2020, 09 pages of ISRWO.

(Continued)

*Primary Examiner* — Mihir K Rayan
(74) *Attorney, Agent, or Firm* — CHIP LAW GROUP

(57) ABSTRACT

An information processing device includes a control unit that has control so that, when detected a status transition of a user including a rising motion or a moving motion of the user during reproduction of a wide-angle image covering the entire field of view of the user, a real-space image acquired by an outward-facing camera provided on a display device that is worn on the head of the user and has a display unit covering the entire field of view is displayed on the display unit in real-time and a 2D image corresponding to a portion of the wide-angle image is displayed on the real-space image.

8 Claims, 14 Drawing Sheets

(51) Int. Cl.
*G06F 3/01* (2006.01)
*G09G 5/38* (2006.01)
*H04N 21/442* (2011.01)
*H04N 21/4728* (2011.01)
*H04N 21/81* (2011.01)

(52) U.S. Cl.
CPC .............. *G06F 3/011* (2013.01); *G06F 3/012* (2013.01); *G06F 3/013* (2013.01); *G09G 5/38* (2013.01); *H04N 21/44218* (2013.01); *H04N 21/4728* (2013.01); *G02B 2027/0138* (2013.01); *G09G 2340/0464* (2013.01); *G09G 2340/12* (2013.01); *H04N 21/816* (2013.01)

(58) Field of Classification Search
CPC .......... G06F 3/011; G06F 3/012; G06F 3/017; G06F 3/04815; G09G 2340/0464; G09G 2340/12; G09G 2354/00; G09G 3/002; G09G 5/38; H04N 21/44218; H04N 21/816; H04N 21/42202; H04N 21/431; H04N 21/4728
See application file for complete search history.

(56) References Cited

U.S. PATENT DOCUMENTS

| | | | | |
|---|---|---|---|---|
| 2013/0259312 | A1* | 10/2013 | Lyons | H04N 9/87 386/230 |
| 2014/0285403 | A1 | 9/2014 | Kobayashi | |
| 2015/0156803 | A1* | 6/2015 | Ballard | H04W 76/10 455/422.1 |
| 2016/0018655 | A1 | 1/2016 | Imoto et al. | |
| 2016/0241908 | A1 | 8/2016 | Guermoud et al. | |
| 2016/0282618 | A1* | 9/2016 | Kon | G02B 27/017 |
| 2017/0315608 | A1* | 11/2017 | Shanware | G02B 27/01 |
| 2018/0005441 | A1 | 1/2018 | Anderson | |
| 2018/0124293 | A1* | 5/2018 | Cohen | H04N 7/18 |
| 2018/0276891 | A1* | 9/2018 | Craner | G08B 7/06 |

FOREIGN PATENT DOCUMENTS

| | | |
|---|---|---|
| CN | 106951316 A | 7/2017 |
| CN | 107111340 A | 8/2017 |
| JP | 7-261112 A | 10/1995 |
| JP | 2007072014 A | 3/2007 |
| JP | 2014-186089 A | 10/2014 |
| JP | 2017069687 A | 4/2017 |
| WO | 2014/156388 A1 | 10/2014 |
| WO | 2019/013016 A1 | 1/2019 |
| WO | 2019/031397 A1 | 2/2019 |

OTHER PUBLICATIONS

Extended European Search Report of EP Application No. 20770776.1, DATED Apr. 7, 2022, 07 pages.
Notification of Intention to Grant Patent for Invention for Patent Application No. 202080018820.7, issued on Mar. 5, 2024, 14 pages of Office Action.
Article 94(3) EPC of EP Application No. 20770776.1, issued on Apr. 8, 2024, 06 pages.

* cited by examiner

INFORMATION PROCESSING DEVICE AND IMAGE PROCESSING METHOD

CROSS REFERENCE TO RELATED APPLICATIONS

This application is a U.S. National Phase of International Patent Application No. PCT/JP2020/004802 filed on Feb. 7, 2020, which claims priority benefit of Japanese Patent Application No. JP 2019-045082 filed in the Japan Patent Office on Mar. 12, 2019. Each of the above-referenced applications is hereby incorporated herein by reference in its entirety.

FIELD

The present disclosure relates to an information processing device, an information processing method, and a computer program.

BACKGROUND

In recent years, virtual reality (VR) technologies that, by using a display device to be worn on the head or the face of a user, what is called a head mount display (HMD), provide the user with virtual videos as if they were real events have been offered.

In the HMD devices, the display screen is located in front of the user's eyes when worn, and there are a transmissive HMD device for which external situation can be seen through the display screen and a shielded HMD device for which the field of view is blocked by the display screen. In the shielded HMD device, external visual information for the user is blocked, which makes it easier to obtain the sense of immersion in the content, and it can be said that it is suitable for providing a virtual reality space. Note that in the case where the transmittance of the display screen can be controlled, both the transmissive type and the shielded type can be implemented with a single HMD device.

Furthermore, in virtual reality technologies, an image obtained by cutting out a portion of a wide-angle image can be presented by following the movement of the user's head. For example, the movement of the user's head can be acquired from a gyro sensor or the like and a 360-degree video of the entire circumference (what is called a spherical image) that follows the movement of the user's head can be made to be experienced. Moving the display area in the wide-angle image so as to cancel the movement of the head detected by the gyro sensor can implement a free-viewpoint viewing and a viewpoint movement environment.

In addition, the user who wears a shielded HMD device to view the content or to perform various works can concentrate on the relevant content or work but is difficult to understand the external situation and was sometimes not aware of external people approaching to communicate. The following Patent Literature 1 discloses a notification-state control method that enables a user wearing a shielded HMD device and an external person to communicate more smoothly.

CITATION LIST

Patent Literature

Patent Literature 1: WO2014/156388

SUMMARY

Technical Problem

However, when it is needed a small move or work in the real space while wearing a shielded HMD device and viewing the content, the HMD device is detached and attached or the transmittance of the display screen is adjusted to change the HMD device to a transmissive HMD device each time, and an important scene may be missed, particularly in the case of live viewing such as sports broadcasting. Even if it is not live viewing, the user wants to enjoy the content viewing without interruption as much as possible.

Solution to Problem

According to the present disclosure, an information processing device is provided that includes a control unit configured to have control so that, when detected a status transition of a user including a rising motion or a moving motion of the user during reproduction of a wide-angle image covering an entire field of view of the user, a real-space image acquired by an outward-facing camera provided on a display device that is worn on a head of the user and has a display unit covering the entire field of view is displayed on the display unit in real-time and a 2D image corresponding to a portion of the wide-angle image is displayed on the real-space image.

According to the present disclosure, an information processing method is provided that includes controlling, by a processor, so that, when detected a status transition of a user including a rising motion or a moving motion of the user during reproduction of a wide-angle image covering an entire field of view of the user, a real-space image acquired by an outward-facing camera provided on a display device that is worn on a head of the user and has a display unit covering the entire field of view is displayed on the display unit in real-time and a 2D image corresponding to a portion of the wide-angle image is displayed on the real-space image.

According to the present disclosure, a computer program is provided that causes a computer to function as a control unit configured to have control so that, when detected a status transition of a user including a rising motion or a moving motion of the user during reproduction of a wide-angle image covering an entire field of view of the user, a real-space image acquired by an outward-facing camera provided on a display device that is worn on a head of the user and has a display unit covering the entire field of view is displayed on the display unit in real-time and a 2D image corresponding to a portion of the wide-angle image is displayed on the real-space image.

DESCRIPTION OF EMBODIMENT

With reference to the accompanying drawings, the following describes in detail a preferred embodiment of the present disclosure. In the present specification and the drawings, constituent elements having a substantially identical functional configuration are denoted by identical reference signs, so that duplicate description will be omitted.

Furthermore, the description will be given in the following order.

1. Outline of Information Processing System in One Embodiment of Present Disclosure
2. Configuration Example
3. Operation Process
3-1. First Example
3-2. Second Example
3-3. Third Example
3-4. Fourth Example
3-5. Fifth Example
3-6. Sixth Example
4. Others
5. Summary

1. OUTLINE OF INFORMATION PROCESSING SYSTEM IN ONE EMBODIMENT OF PRESENT DISCLOSURE

Figure 1:
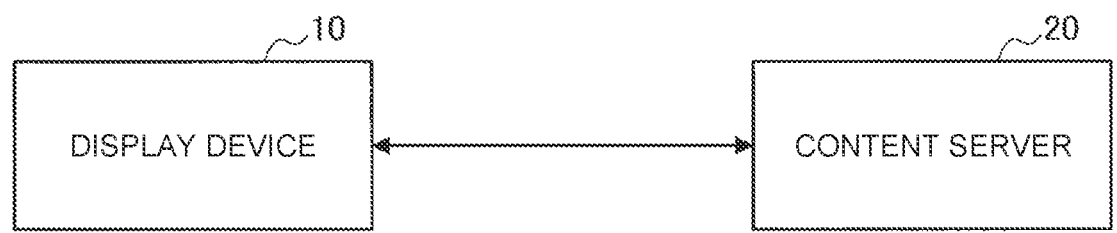
FIG. 1 is a diagram explaining the outline of an information processing system according to one embodiment of the present disclosure.

FIG. 1 is a diagram explaining the outline of an information processing system according to one embodiment of the present disclosure. The information processing system in the present embodiment includes, as illustrated in FIG. 1, a display device 10 (information processing device) and a content server 20.

The display device 10 is a device having a display unit 150 (FIG. 2) that presents an image of virtual space to a user. For example, the display device 10 is implemented by an HMD device to be worn on the head or the face of the user. The HMD device has an image display unit for each of the left and right eyes and is configured such that, by using headphones in combination, vision and hearing can be controlled. In addition, the HMD device can also project different videos to the left and right eyes, and by displaying images having parallax for the left and right eyes, can also present a 3D image.

Furthermore, the display device 10 has an inertial measurement unit (IMU) that senses the real space in order to recognize the position and posture of the user, an outward-facing camera, an inward-facing camera, a microphone, and the like.

The display device 10 acquires content of a virtual space from the content server 20. The display device 10 generates, from the acquired content, a free-viewpoint image according to the movement of the user and displays it on the display unit 150. The movement of the user includes the posture of the user and, based on the various sensing data for which the user was sensed, the display device 10 follows the posture of the user. For example, the display device 10 can, based on the sensing data, perform head tracking and eye-tracking. In addition, the information processing system in the present disclosure may further include a remote controller or a game controller to communicate the intent of the user to the system. In the case where the user is expected to view virtual space content in a sitting position or standing still state, it is assumed that the forward, backward, upward, downward, leftward, and rightward movement in a virtual space can be moved by the operation of the remote controller or the game controller.

In the present embodiment, it will be described that the generation of free-viewpoint images and the tracking processing are performed by the display device 10, but the present disclosure is not limited thereto, and it may be configured to be performed by an external device.

Furthermore, the content of the virtual space provided to the user is spherical content, free-viewpoint content, game content, or the like. The spherical content is the content of 360-degree video of the entire circumference (what is called a spherical image), but it may be a wide-angle image (for example, a 180-degree image) that covers at least the entire field of view of the user. In addition, the free-viewpoint content is the content that, by using video captured by using a plurality of cameras, generates video when placing a virtual camera at any desired position, so that video viewing can be allowed from any viewpoint. For example, a person or an object acquired from a plurality of cameras is 3D modeled and then combined and complemented, thereby allowing viewing from any desired viewpoint including an angle where there is no camera. The content is recorded or in real-time.

The term "virtual space" (what is called VR space) used herein refers to the representation of a real or fictitious environment having rules of interaction that is simulated by one or more processors for which the actual user can sense via one or more display devices and/or interact via one or more user interfaces. In a virtual space, the user may be represented by an avatar or, without displaying the avatar on the display, a virtual space world from the viewpoint of the avatar may be displayed. In the present specification, the viewpoint of the user (or of the avatar) in the virtual space can be regarded as the field of view of a virtual camera. The "virtual camera" refers to the viewpoint in the virtual space and is used for calculations to draw a three-dimensional virtual space as a two-dimensional image on the display (display device).

BACKGROUND

While viewing the content of a spherical image or at least a wide-angle image that covers the entire field of view of the user by wearing an HMD device in a state of substantially blocking the entire field of view of the user, when a small movement or work in the real space is needed such as going to a bathroom, making coffee, responding to a visit, or the like, it has been needed that the user detaches and attaches the HMD device or operates it such that the real space can be seen each time. In this case, in particular, in viewing live such as sports broadcasting or event broadcasting, an important scene may be missed while leaving the seat and non-displaying the content. In addition, even if it is not viewing live, it is desirable to enjoy the content viewing without interruption as much as possible while being away from the seat also.

Thus, in the present disclosure, offered is a scheme capable of improving usability by allowing the user to leave the seat while continuing to view a portion of a wide-angle image during the viewing of the wide-angle image covering the entire field of view of the user.

2. CONFIGURATION EXAMPLE

Figure 2:
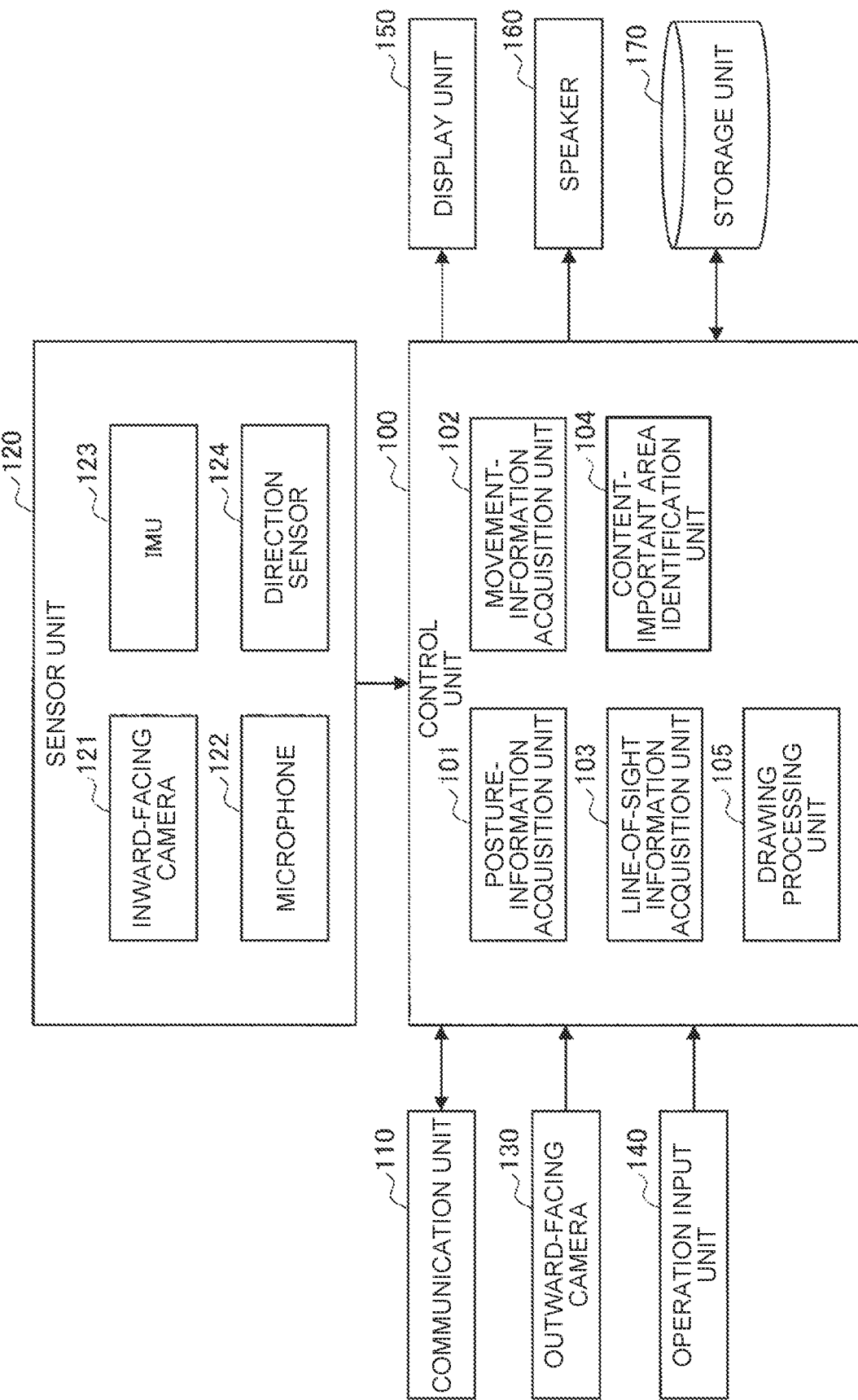
FIG. 2 is a block diagram illustrating one example of a configuration of a display device in the present embodiment.

FIG. 2 is a block diagram illustrating one example of a configuration of the display device 10 in the present embodiment. As illustrated in FIG. 2, the display device 10 in the present embodiment includes a control unit 100, a communication unit 110, a sensor unit 120, an outward-facing camera 130, an operation input unit 140, the display unit 150, a speaker 160, and a storage unit 170.

2-1. Sensor Unit 120

The sensor unit 120 senses a user status or surrounding situation at a certain period and outputs the sensed information to the control unit 100. The sensor unit 120 has a plurality of sensors such as an inward-facing camera 121 that captures the user's eyes when the display device 10 is worn on the head or the face of the user, a microphone 122 that collects the user's voice or surrounding sound, an IMU 123 that senses the movement of the user, and a direction sensor 124 that detects the orientation of the display device 10.

The inward-facing camera 121 is a camera (for example, an infrared sensor having an infrared emitting unit and an infrared imaging unit) that captures the eyes of the user wearing the display device 10. The inward-facing camera 121 may be provided both for right-eye capturing and left-eye capturing or may be provided only for one of them.

The microphone 122 collects the user's voice and ambient sound (such as environmental sounds) and outputs an audio signal to the control unit 100.

The IMU 123 is one example of a motion sensor that has a three-axis gyro sensor and a three-axis acceleration sensor and can calculate a three-dimensional angular velocity and acceleration. Note that the motion sensor may be a sensor capable of detecting a total of nine axes by further having a three-axis geomagnetic sensor. Alternatively, the motion sensor may be a sensor of at least one of a gyro sensor and an acceleration sensor.

The direction sensor 124 is a sensor that measures the orientation of the display device 10 and is implemented by a geomagnetic sensor, for example.

2-2. Control Unit 100

The control unit 100 functions as an arithmetic processing unit and a control device and controls the overall operation of the display device 10 in accordance with various computer programs. The control unit 100 is implemented by an electronic circuit such as a central processing unit (CPU) and a microprocessor, for example. The control unit 100 may also include a read only memory (ROM) that stores computer programs, calculation parameters, and the like to be used and a random access memory (RAM) that temporarily stores parameters and the like that change as appropriate.

In addition, the control unit 100 in the present embodiment also functions as a posture-information acquisition unit 101, a movement-information acquisition unit 102, a line-of-sight information acquisition unit 103, a content-important area identification unit 104, and a drawing processing unit 105.

The posture-information acquisition unit 101 acquires (calculates), based on the sensing data acquired from the sensor unit 120, the posture information (including the head posture) on the user. For example, the posture-information acquisition unit 101 can calculate, based on the sensing data of the IMU 123 and the direction sensor 124, the user posture including the head posture of the user. This also makes it possible to grasp a transition state of the user's body such as whether the user has sat down or stood up.

The movement-information acquisition unit 102 acquires (calculates), based on the sensing data acquired from the sensor unit 120, the information concerning the actual movement of the user in the real space. For example, the movement-information acquisition unit 102 acquires, based on the sensing data of the IMU 123 and the direction sensor 124, the movement information including walking of the user, the direction of travel, and the like.

The line-of-sight information acquisition unit 103 acquires (calculates), based on the sensing data acquired from the sensor unit 120, line-of-sight information on the user. For example, the line-of-sight information acquisition unit 103 calculates, based on the sensing data of the inward-facing camera 121, the line-of-sight direction of the user and a gazing point (line-of-sight position). In this case, the inward-facing camera 121 is used as one example of a line-of-sight detection sensor for acquiring (calculating) the user's line-of-sight information, but the line-of-sight detection sensor is not limited thereto and may be a myoelectric sensor that detects the movement of muscles around the user's eyes or an electroencephalogram sensor. Furthermore, the line-of-sight information acquisition unit 103 may, by using the head posture (orientation of the head) acquired by the posture-information acquisition unit 101, estimate the line-of-sight direction in a pseudo manner.

The content-important area identification unit 104 has a function to identify an important area in the content that the user is viewing. The criteria for determining the important area may be set in advance according to the content. For example, in the case of live video of football, an area containing at least the ball and the player closest to the ball is identified as an important area.

The drawing processing unit 105 performs generation and display control of an image to be displayed on the display unit 150. For example, as in the foregoing, the drawing processing unit 105 generates, from the content (for example, a spherical image that is the video of virtual space) acquired from the content server 20, a free-viewpoint image according to the operating input by the motion of the user or the controller and displays it on the display unit 150.

In addition, the drawing processing unit 105 in the present embodiment has control so that the real-space image acquired by the outward-facing camera 130 provided in the display device 10 is displayed on the display unit 150, and the outside world can be seen even in a state of wearing a shielded HMD device (what is called video see-through). This enables the user to perform a safe moving or work in the real space, in a state of wearing the shielded HMD device.

In this case, when the user rises and leaves the seat (detection of a status transition of the user including a rising motion or moving motion of the user) while viewing a wide-angle image covering at least the entire field of view of the user such as a spherical image, the drawing processing unit 105 has control so that the real-space image is displayed in real-time and a 2D image representing a portion of the wide-angle image that has been viewing is displayed on the real-space image. This allows the user to continue viewing at least a portion of the wide-angle image while leaving the seat and moving or working in the real space. For example, by displaying the important area of the content as a portion of the wide-angle image, it is possible to prevent missing an important scene while being away from the seat. Furthermore, the drawing processing unit 105 may include the area (gazing area) at which the user was looking immediately before leaving the seat in a portion of the wide-angle image to be displayed. Furthermore, the drawing processing unit 105 may place the 2D image representing a portion of the wide-angle image at a certain location in a local coordinate system with reference to the display device 10.

2-3. Communication Unit 110

The communication unit 110 connects to the content server 20 by wire or wirelessly to transmit and receive data. The communication unit 110 connects to and communicates with the content server 20 by a wired/wireless local area network (LAN), Wi-Fi (registered trademark), Bluetooth (registered trademark), or the like.

2-4. Outward-Facing Camera 130

The outward-facing camera 130 images the real space and outputs a captured image (real-space image) to the control unit 100. A plurality of outward-facing cameras 130 may be provided. For example, by a stereo camera on which a plurality of outward-facing cameras 130 are provided, a right-eye image and a left-eye image can be acquired.

2-5. Operation Input Unit 140

The operation input unit 140 detects the operating input of the user to the display device 10 and outputs the operating input information to the control unit 100. The operation input unit 140 may be a touch panel, buttons, switches, levers, and the like, for example. Furthermore, the operating input of the user to the display device 10 is not limited to the physical operation by the buttons and the like but may be gesture input or voice input. The user can also use a controller separate from the display device 10 to perform operating input.

2-6. Display Unit 150

The display unit 150 includes, when the display device 10 is configured as an HMD device, the left and right screens fixed to correspond to the left and right eyes, respectively, of the user and displays the left-eye image and the right-eye image. Furthermore, the display unit 150 is provided so as to cover at least the entire field of view of the user. Furthermore, the screen of the display unit 150 may be a display panel such as a liquid crystal display (LCD) or an organic electro luminescence (EL) display.

2-7. Speaker 160

The speaker 160 is configured as headphones to be worn on the user's head when the display device 10 is configured as an HMD device and reproduces an audio signal. Furthermore, the speaker 160 is not limited to the headphone type and may be configured as earphones or bone conduction speakers.

2-8. Storage Unit 170

The storage unit 170 is implemented by a read only memory (ROM) that stores computer programs, calculation parameters, and the like to be used for the processing of the control unit 100 and a random access memory (RAM) that temporarily stores parameters and the like that change as appropriate. In addition, in the storage unit 170, the content (spherical image and the like) of virtual space acquired from the content server 20 may be stored.

As in the foregoing, the configuration of the display device 10 has been described specifically, but the configuration of the display device 10 by the present disclosure is not limited to the example illustrated in FIG. 2. For example, at least a part of the functional configuration of the control unit 100 may be provided in an external device (for example, an information processing device that connects to and communicates with the display device 10, a server on a network, or the like).

In addition, when the content is not that delivered from the content server 20 in real-time such as live video, the content can be reproduced, by storing the content in the storage unit 170 in advance, even in a state of not being connected to the network.

3. OPERATION PROCESS

Next, the flow of display control processing according to the state transition of the user during the reproduction of a wide-angle image covering the entire field of view of the user in the present embodiment will be described specifically with reference to the drawings. In this case, as one example of a wide-angle image, a spherical image is used.

3-1. First Example

Figure 3:
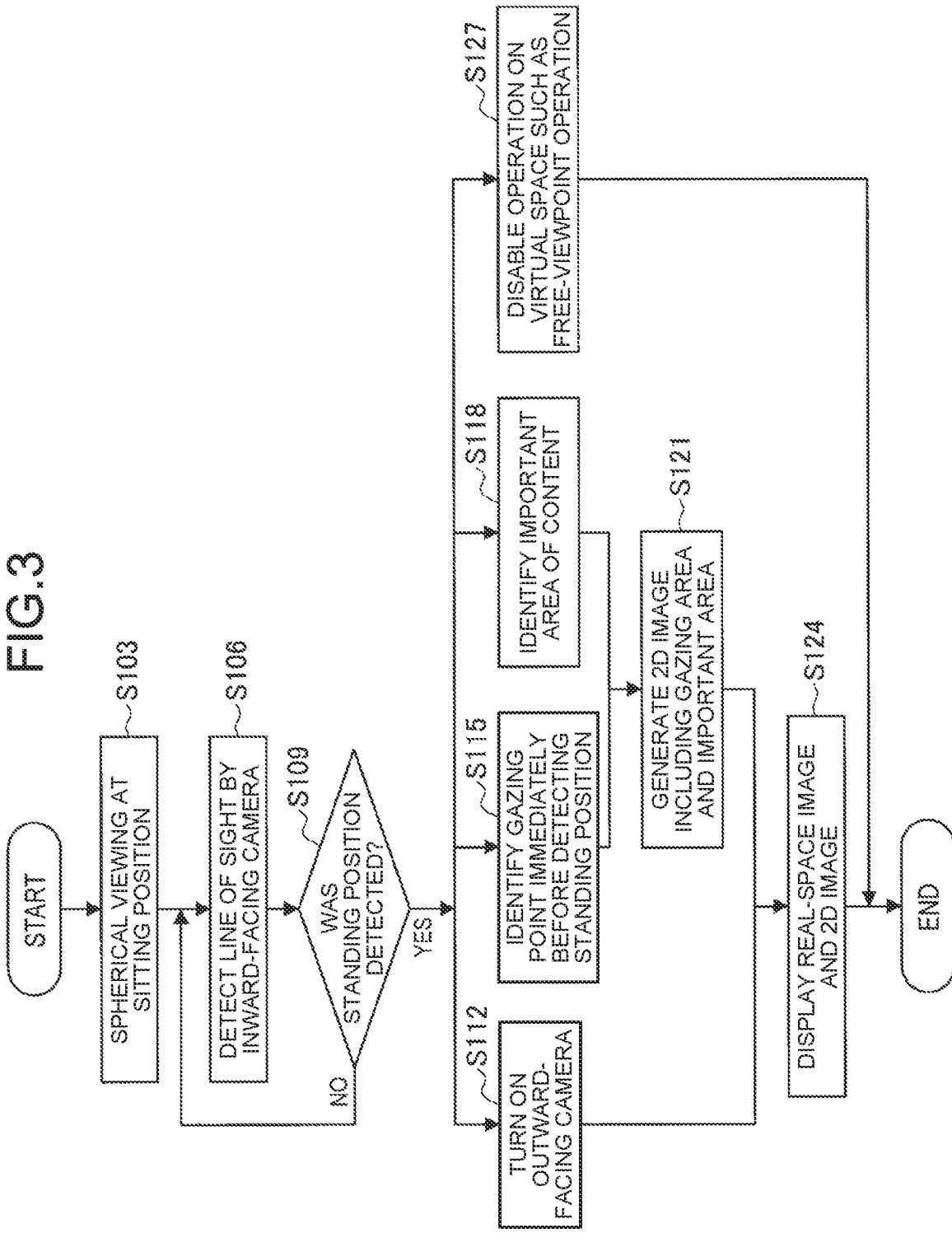
FIG. 3 is a flowchart illustrating one example of the flow of an operation process by a first example.

FIG. 3 is a flowchart illustrating the flow of an operation process by a first example. As illustrated in FIG. 3, while the user wearing the display device 10 is viewing the spherical image in a sitting position (Step S103), the display device 10 continuously detects, by the inward-facing camera 121, the line of sight of the user (Step S106).

Then, the display device 10 detects, based on the sensing data sensed from the IMU 123, a rising motion (standing position) of the user by the posture-information acquisition unit 101 (Step S109). When the posture simply moves while in the sitting position (such as leaning forward or looking around), it is not detected as a standing position, and the display device 10 can move the viewpoint of the user in the virtual space according to the change in the user's posture.

Then, if a standing position of the user is detected (Yes at Step S109), the display device 10 assumes that the user leaves the seat, and performs the processing of turning on the outward-facing camera 130 (Step S112), the identifying of the gazing point of the user in the spherical image immediately before the standing position detection (Step S115), the identifying of an important area in the content (spherical image) (Step S118), and the disabling of operation on the virtual space such as free-viewpoint operation (Step S127). Those processes may be processed in parallel.

The outward-facing camera 130 that acquires a real-space image is basically turned off while the user is viewing a spherical image in order to reduce power consumption, but because moving or work in a real space is expected when the user rises, the outward-facing camera 130 is controlled to be on and the real-space image is acquired.

Subsequently, the display device 10 generates a 2D image including the identified gazing area and the important area from the spherical image by the drawing processing unit 105.

Figure 4:
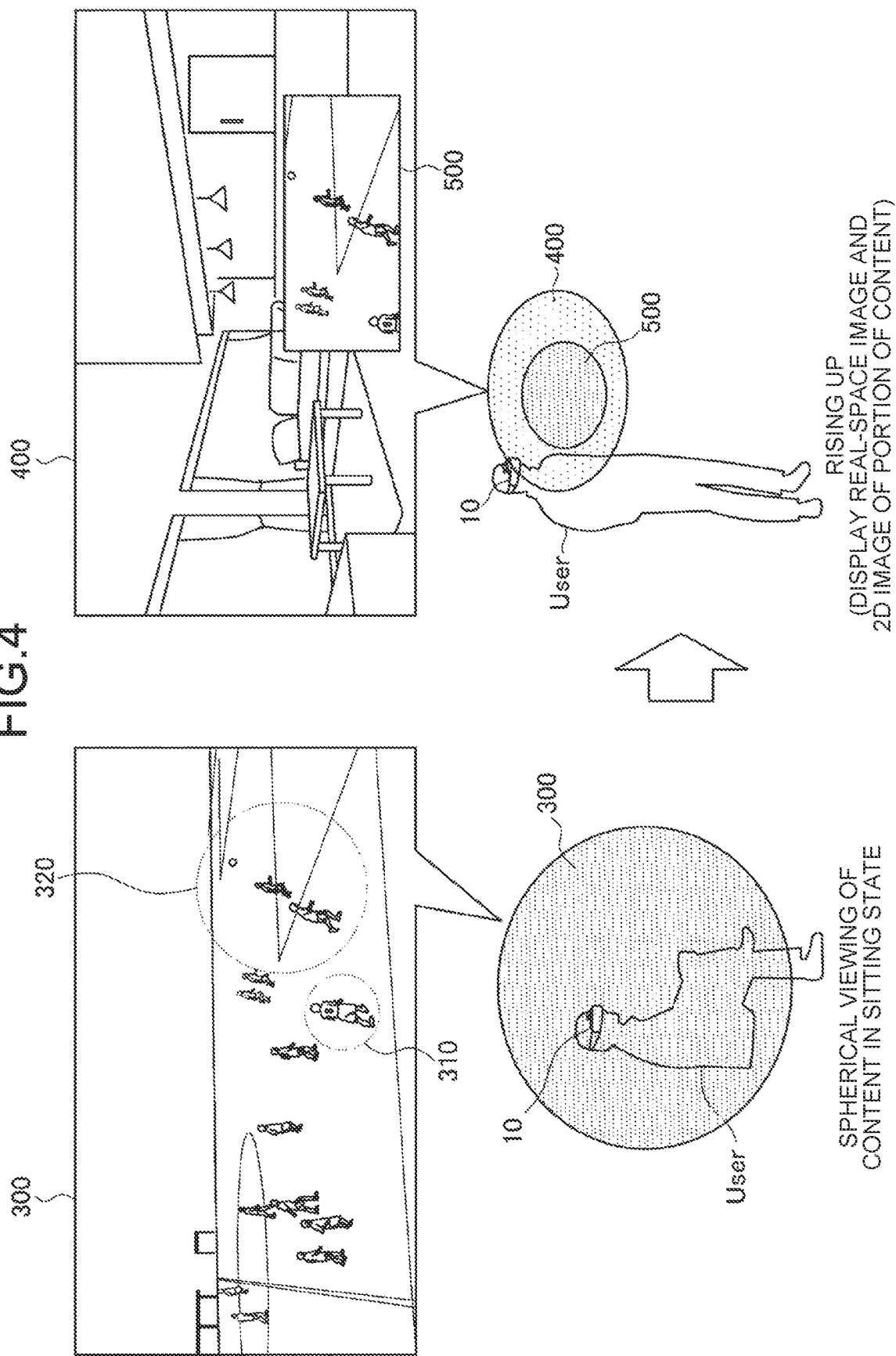
FIG. 4 is a diagram illustrating a display example of a 2D image representing a portion of a spherical image by the first example.

Then, the display device 10 displays the real-space image on the display unit 150 and, on the real-space image, displays a portion of the spherical image, specifically, a 2D image including the important area and further a 2D image including the gazing area at which the user was gazing immediately before (Step S124). FIG. 4 is a diagram illustrating a display example in the display unit 150 of the display device 10 in the first example. As illustrated on the left side of FIG. 4, while the user is viewing the spherical image using the display device 10 in a sitting state, when the user rises, as illustrated on the right side of FIG. 4, a real-space image 400 is displayed so as to put it in a video see-through state, and a 2D image 500 including a gazing area 310 at which the user was gazing immediately before and an important area 320 (for example, a football and a chasing player) of the present content is displayed on the real-space image 400 in a superimposed manner.

As a result, at least a portion of the content can be viewed continuously without disturbing the moving or the work in the real space and, in particular, by displaying the 2D image including at least the important area 320 of the content, missing an important scene such as the moment of a goal, for example, can be prevented.

The display position of the 2D image 500 is not specifically limited, and it may be displayed at a certain position (for example, below the field of view) in the local coordinate system with reference to the display device 10, for example. When the user starts to walk, it may be placed at a position not interfering with the movement of the user.

The shape of the 2D image 500 may be a quadrangle as illustrated in FIG. 4 or may be a circular shape, an elliptical shape, or the like. The display device 10 may further make the layer of the background image be the real-space image, and by continuously reducing the area of the spherical image and switching it to the 2D image 500, may display it on the real-space image in a superimposed manner.

The display device 10 further controls the display angle of view so that an important portion of the spherical image is always visible in the 2D image 500.

3-2. Second Example

In the above-described example, the case where the 2D image 500 having an angle of view including the last gazing area of the user and the important area is displayed has been described, but when the gazing area and the important area are too far apart or the like, the video may be too reduced and be hard to see, when the angle of view is made to include both areas. Thus, as a second example, the display control that transitions the angle of view of a 2D image to an important area so that the user does not lose sight of the moving destination of the display angle of view will be described with reference to FIG. 5 to FIG. 7.

Figure 5:
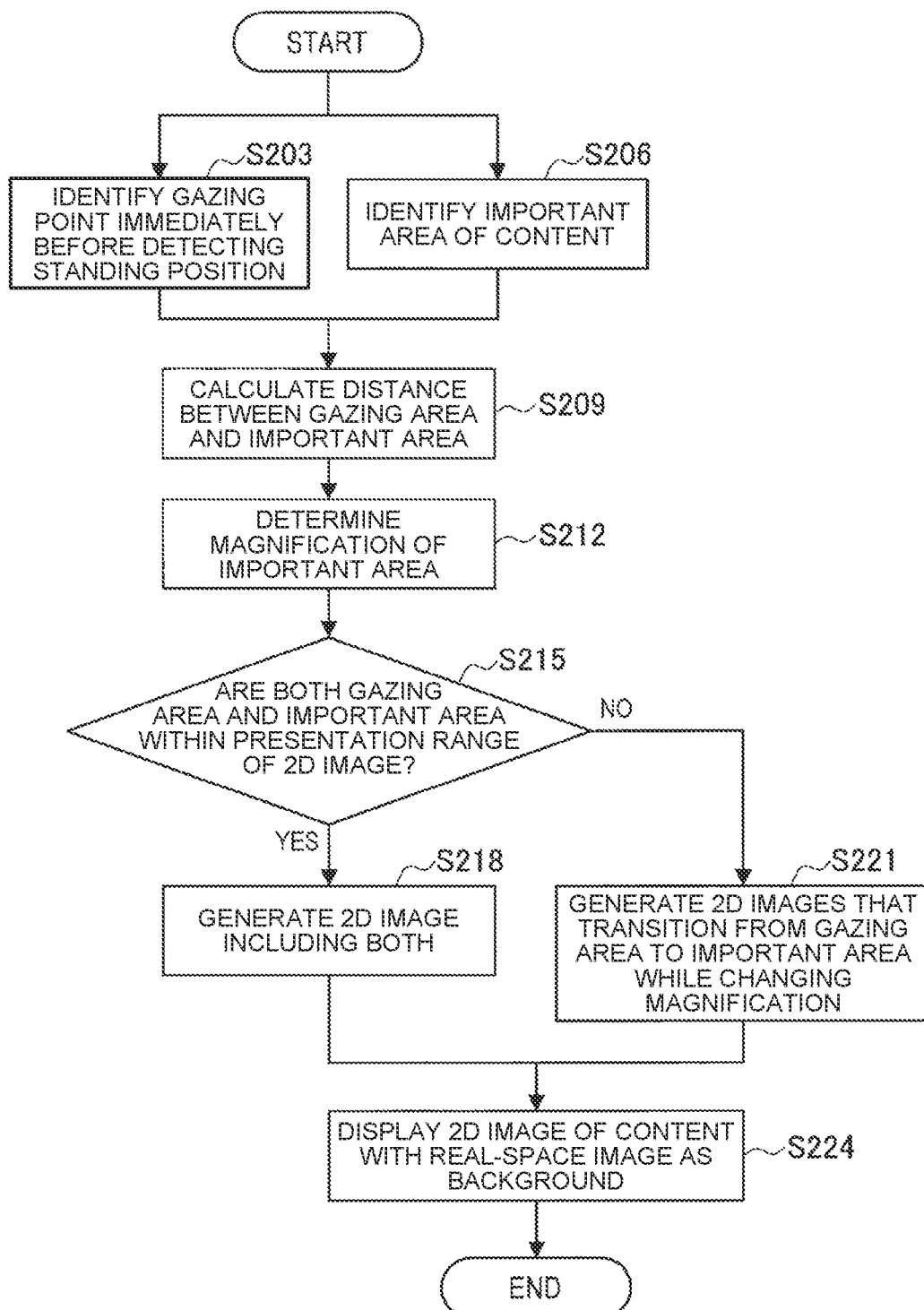
FIG. 5 is a flowchart illustrating one example of the flow of an operation process by a second example.

FIG. 5 is a flowchart illustrating the flow of an operation process by the second example. As illustrated in FIG. 5, the display device 10 first identifies a gazing point of the user immediately before detecting a standing position (Step S203) and also identifies an important area of the content (spherical image) (Step S206).

Next, the display device 10 calculates the distance between the gazing area and the important area (Step S209).

Then, the display device 10 determines the magnification of the important area (Step S212). The magnification of the important area is predetermined. For example, in the case of football broadcasting, the magnification at which the ball is in a certain size (recognizable size) may be set.

Next, the display device 10 determines whether both the gazing area and the important area are within the presentation range of the 2D image (that is, the display size of the 2D image, angle of view) (Step S215). Because the display size of the 2D image is also predetermined basically (as an exception, because it may be controlled to be small when the user is working and the like in the real space, so as not to disturb the work area), the display device 10 may determine based on whether the distance between the gazing area and the important area exceeds a certain value, for example. Furthermore, when the image is reduced and displayed, it may fit within the presentation range of the 2D image, but if it is too small, it is difficult to see, and thus, as in the foregoing, by considering the predetermined magnification, it may be determined whether both the gazing area and the important area are within a certain angle of view.

Then, if both are included (Yes at Step S215), the drawing processing unit 105 of the display device 10 generates a 2D image that includes both (Step S218).

On the other hand, if not both are included (No at Step S215), the drawing processing unit 105 of the display device 10 generates 2D images that transition while changing the display magnification from the gazing area to the important area (Step S221). A specific display example will be described later with reference to FIG. 7. The drawing processing unit 105 of the display device 10 may generate 2D images that focus (magnify) from a wide range (reduced image) including both the gazing area and the important area to the important area. Such an example will be described later with reference to FIG. 6.

Then, the display device 10 controls so that, on the display unit 150, a 2D image of the content (spherical image) is displayed with the background of the real-space image (Step S224).

Specific Display Example

Specific display examples of 2D images in the second example will be described with reference to FIG. 6 and FIG. 7.

Figure 6:
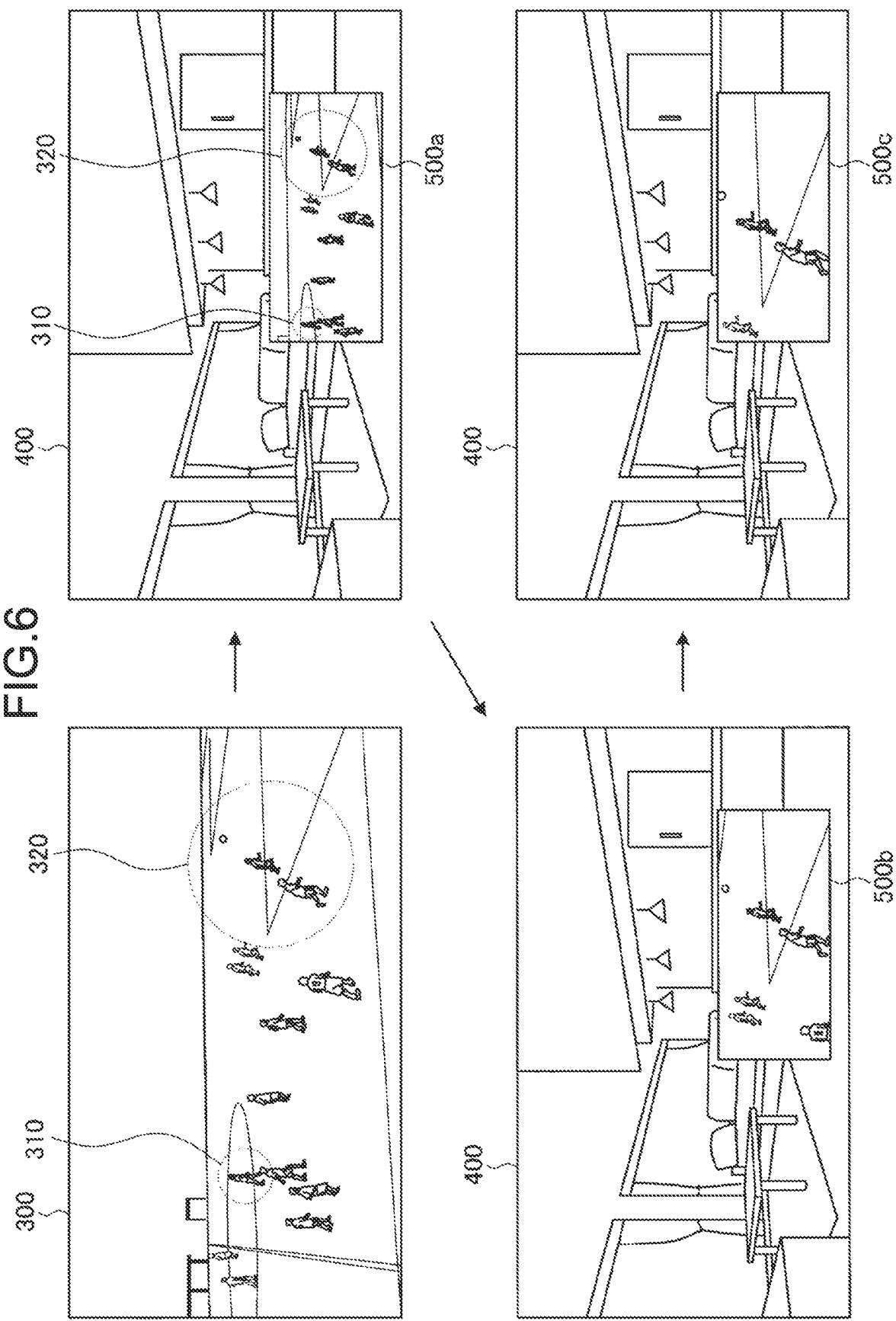
FIG. 6 is a transition diagram illustrating a display example of 2D images representing a portion of a spherical image by the second example.

FIG. 6 is a transition diagram illustrating a display example of 2D images representing a portion of a spherical image by the second example. For example, as illustrated in the upper left of FIG. 6, when the gazing area 310 and the important area 320 are apart and are not within the presentation range of the 2D image, the display device 10 may first, as illustrated in the upper right of FIG. 6, present a 2D image 500a including both the gazing area 310 and the important area 320 by reducing the image, and then, as illustrated in the lower left of FIG. 6, present a 2D image 500b that focused on the important area 320, and finally, as illustrated in the lower right of FIG. 6, display a 2D image 500c in which the important area 320 was enlarged to a certain magnification.

Figure 7:
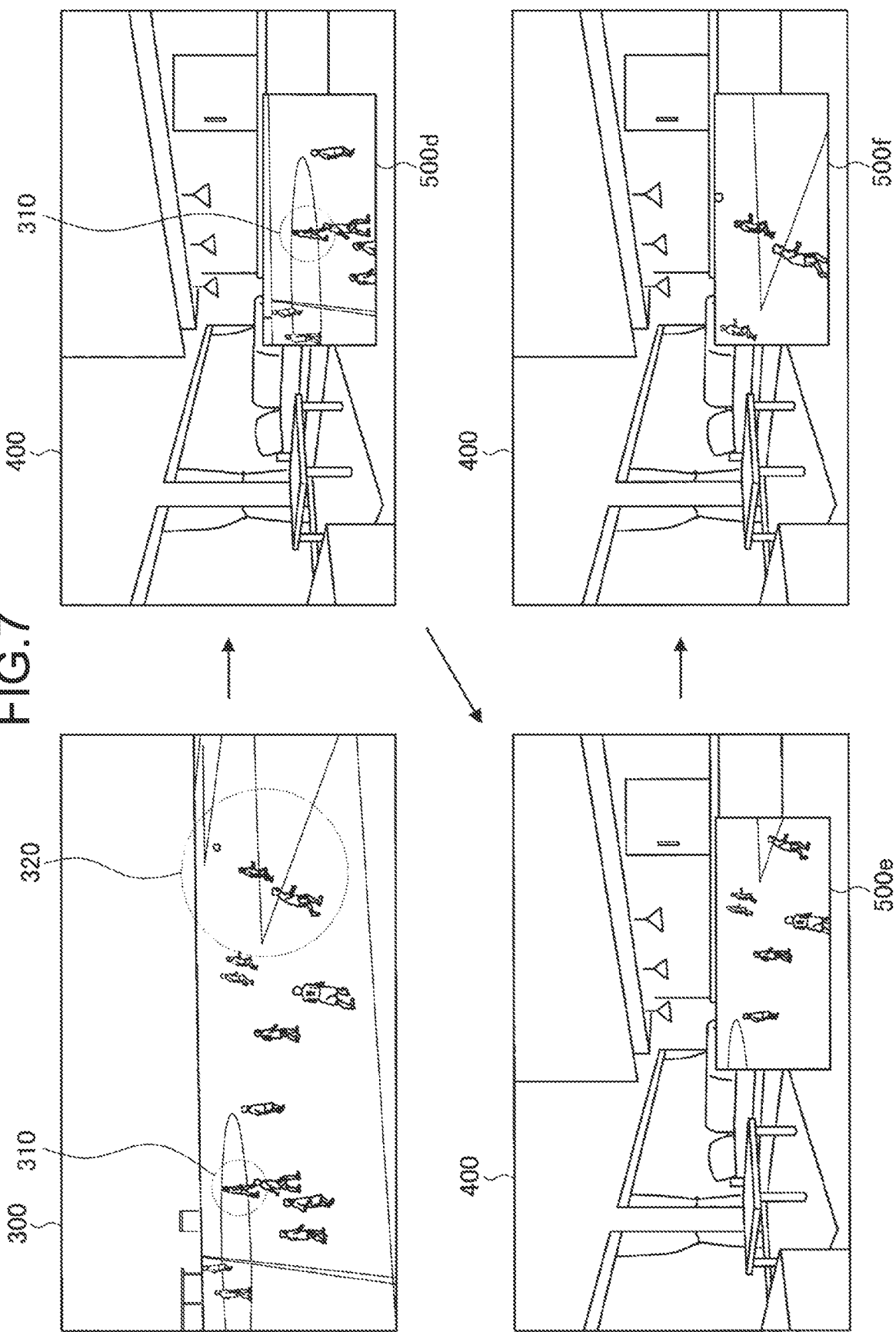
FIG. 7 is a transition diagram illustrating another display example of 2D images representing a portion of a spherical image by the second example.

In addition, as illustrated in the upper left of FIG. 7, similarly, when the gazing area 310 and the important area 320 are apart and are not within the presentation range of the 2D image, the display device 10 may first, as illustrated in the upper right of FIG. 7, present a 2D image 500d including the gazing area 310, and then, as illustrated in the lower left of FIG. 7, present a 2D image 500e in which the display angle of view transitions toward the important area 320, and finally, as illustrated in the lower right of FIG. 7, display a 2D image 500f that includes the important area 320 and was enlarged to a certain magnification.

By transitioning from the gazing area to the important area in this way, the user can be prevented from losing sight of the moving destination of the display angle of view and not knowing where it has transitioned.

Furthermore, the display device 10 may, in order to clarify the transition destination of the display angle of view, highlight the important area (for example, illuminating it, surrounding it with blinking lines, or displaying an arrow) in advance, and then transition.

Furthermore, the display device 10 may, when the gazing area is different from the important area portion, annotate (may highlight as with the foregoing).

Furthermore, the display device 10 may display the gazing area for a specific period of time and then transition from there to the important area (at that time, a countdown display and the like may be used).

3-3. Third Example

Subsequently, the control of the display position of the 2D image 500 when the user rises and further starts moving will be described with reference to FIG. 8 and FIG. 9.

Figure 8:
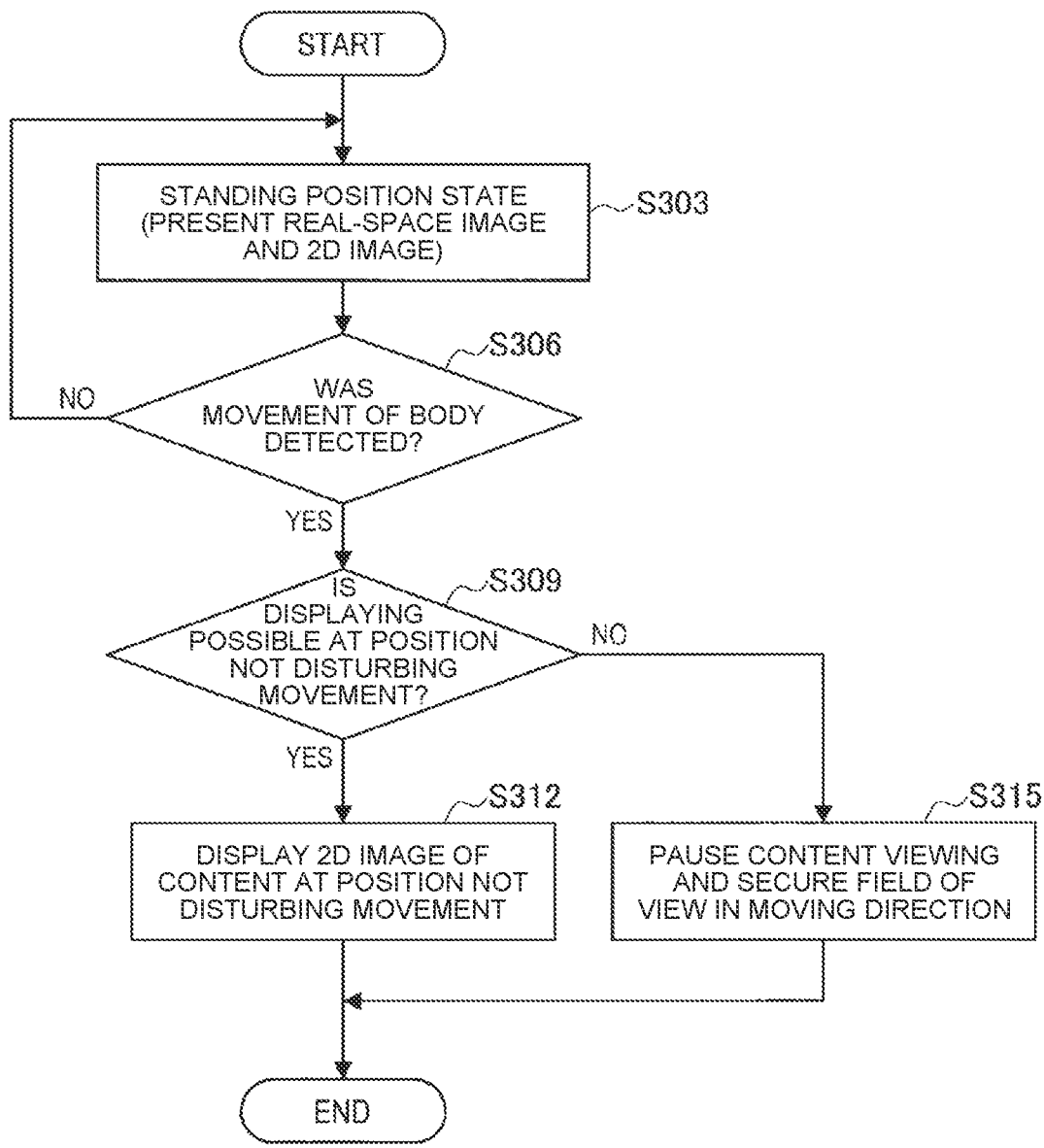
FIG. 8 is a flowchart illustrating one example of the flow of an operation process by a third example.
Figure 9:
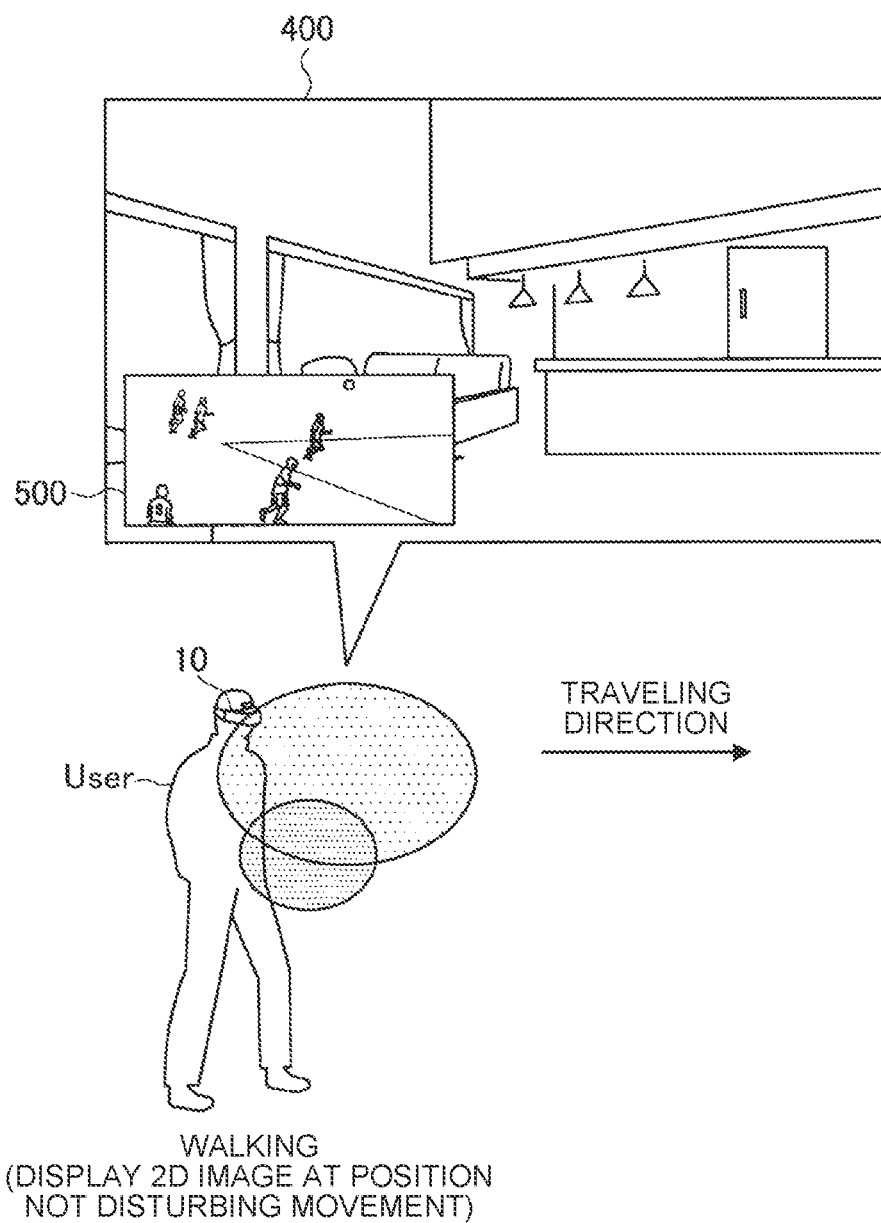
FIG. 9 is a diagram illustrating a display example of a 2D image representing a portion of a spherical image by the third example.

FIG. 8 is a flowchart illustrating the flow of an operation process by a third example. As illustrated in FIG. 8, the display device 10 first detects, after being in a standing position state (in a state where a real-space image and a 2D image are presented on the display unit 150) (Step S303), the movement of the user's body (Step S306). In this case, when actually started walking and the like, but not the posture change in a degree of leaning forward, is performed, it is detected as the movement of the body. For example, the movement-information acquisition unit 102 of the display device 10 can detect, based on the sensing data from the IMU 123, the direction sensor 124, and the communication unit 110, the movement of the user's body.

Next, the display device 10 determines whether the 2D image can be displayed at a position that does not disturb the movement (Step S309). The position that does not disturb the movement is assumed to be, in a real-space image, a place avoiding the traveling direction of or the feet of the user, a wall, a ceiling, and the like. For example, it can be determined that, when it can be estimated that the traveling direction of the user is straight from the shape of the corridor and the like, it can be placed on the left or the right side of the corridor, and that, when there are many objects on a passage and the user has to walk carefully, it can be placed upward.

Next, when determined that it can be displayed at a position that does not disturb the movement (Yes at Step S309), the display device 10 controls so as to display the 2D image at a position that does not disturb the movement of the user (Step S312). Herein, FIG. 9 illustrates a display example of a 2D image representing a portion of a spherical image by the third example. As illustrated in FIG. 9, for example, when the user is walking toward the kitchen located to the right in the real-space image 400, the display device 10 displays the 2D image 500 to the left.

On the other hand, when determined that it is not possible to be displayed at a position that does not disturb the movement (No at Step S309), the display device 10 turns the 2D image into non-display and pauses the content viewing, and secures the field of view in the moving direction (Step S315). In this case, when the user is in a sitting position and is ready to view again, the chased reproduction or the chased high-speed reproduction of the content, the digest reproduction during stopping, and the like may be performed.

Line-of-Sight Use

The display device 10 in the present embodiment may, by using the line of sight of the user, control the reproduction of the content (spherical image).

For example, in the case of non-real-time content such as live video, the display device 10 may continue the reproduction when the user's line of sight is within the content (for example, within a 2D image representing a portion of the content superimposed on the real-space image) for a specific period of time or longer, and when the line of sight is off for a specific period of time or longer, pause the reproduction. When controlling the reproduction and the stopping by the line-of-sight state, at the time of resuming, the reproduction may be started in duplicate from the portion for a specific period of time before stopping.

Furthermore, while the certainty factor of the IMU is low (when the estimation was not successful), when the gazing point of the user is continuously on the viewing content (object in the content), the display device 10 may determine that the user is simply moving the posture, not a standing position, and prioritize the content viewing. Conversely, when the gazing point is not on the object in the content or is moved to the periphery, it may be determined to be a standing position.

Furthermore, the display device 10 may personalize the important area according to the line of sight. It is useful when the important area may differ from person to person. Specifically, when the gazing point distribution in the content viewing space is concentrated at a specific position within a specific period of time, the display device 10 can presume the relevant portion as an important area for the user and personalize the important area. Then, for example, while the user's line of sight is in the real-space image, at least the personalized important area of the content is stored (recorded), and when returned to the content viewing, the chased reproduction or the chased high-speed reproduction of the relevant important area, or the digest reproduction during stopping may be performed.

Display of 2D Image in Working in Real Space

Figure 10:
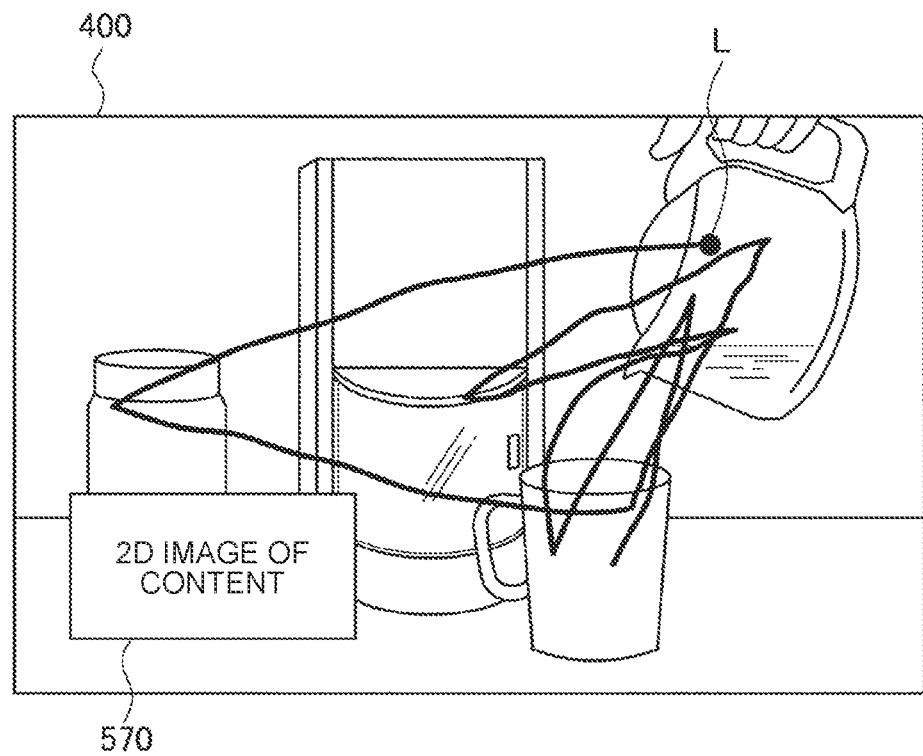
FIG. 10 is a diagram explaining the display position of a 2D image of content when working in a real space in the present embodiment.

The display device 10 may, when the moving speed is less than or equal to a certain value and the gazing point is not directed to the content (2D image), assume being in work (making coffee, going to a bathroom, responding to delivery service, or the like) in a real space. In this case, the display device 10 determines, according to the movement of the line of sight, the presentation position of the content (2D image). For example, as illustrated in FIG. 10, the locus of a gazing point L is analyzed when the user is working at hand or at his/her feet and a position that does not disturb the work is identified, and then the placement of a 2D image 570 of the content is adjusted. For example, in the vicinity of the line-of-sight position in working, a position where there is no object, a position where the body such as a user's hand is not detected, and the like can be assumed.

Furthermore, the display device 10 may, by analyzing the real-space image and detecting in advance what work the user is trying to do, control the placement of the 2D image. For example, when it is predicted that coffee is made, the places where sugar, milk, and the like are present are also excluded from the 2D image placement possible area in advance.

The display device 10 can further perform reproduction control according to the motion range of the user. Specifically, when the work area of the user extends beyond a specific range in the real space such as the presence of changes in the body direction greater than or equal to a specific frequency (work in a wide range such as drying laundry, moving objects, or the like), the reproduction of the 2D image of the content may be paused in order not to disturb the work, and be resumed when the user is ready to view such as sitting down again.

Furthermore, the display device 10 may pause the content (2D image) when detected that the user is interacting with others in the real space.

Display Example of 2D Image

The display device 10 may analyze in advance the content that is not real-time video, and present the relevant information to the user when the time of excitement is near, or impart an effect that makes the display angle of view difficult to shrink or an effect that is different from normal when shrinking, in changing the spherical image to a 2D image when the time of excitement is near. Even if the real-time content, when the excitement is expected, the relevant information may be presented to the user.

Furthermore, the display device 10 may control the reproduction of the content according to the surrounding environment. For example, the display device 10 may, when the real space is a bright place, increase the brightness of the content (2D image) and present it in a large size. In addition, the display device 10 may, in a noisy place, reduce the sound of the 2D-imaged content not so much. In addition, the 2D image of the content may be displayed at a place where the color of the real space is different from the hue of the content.

Furthermore, when the important area cannot be identified, the display device 10 may default to the display control in which the display angle of view is reduced toward the center of the spherical image (for example, the center of the user's line of sight) to form a 2D image. Alternatively, the place where the character is present in the spherical image may be regarded as an important area.

In addition, the user may be allowed to arbitrarily set the mode in which the 2D-image display can be viewed continuously.

The shape of the 2D image is not limited to a uniform square or circle and may be scaled to a shape suitable for the content. The 2D image may be a plurality of videos (for example, a score display screen in the content of football broadcasting, a play display screen for around the ball, and the like).

Furthermore, when switching the display by detecting a standing position or movement of the user, the display device 10 can also shift an intermediate state of transition of the display screen by animation so as to prevent the screen from switching abruptly. Furthermore, when the transition from a sitting position to a standing position is detected, the 2D image may be displayed at the same specific position (for example, the center of the field of view) each time, and then be moved to an appropriate position (the user can be made not to miss the image that has been changed from the spherical image to the 2D image).

Furthermore, it is expected that fluttering may occur due to the influence of the detection section of the sensing, but meanwhile, it is desirable to switch without latency as much as possible. For this reason, the display device 10 may start switching the display when detected a standing position, but not complete the transition for a specific period of time, and then complete the transition of switching when the certainty factor of recognizing the moving motion is greater than or equal to a specific value, for example. In addition, when the user's line of sight can be used, the transition in switching may be started at the time the line of sight was shifted to the real-space image (of the background).

3-4. Fourth Example

Figure 11:
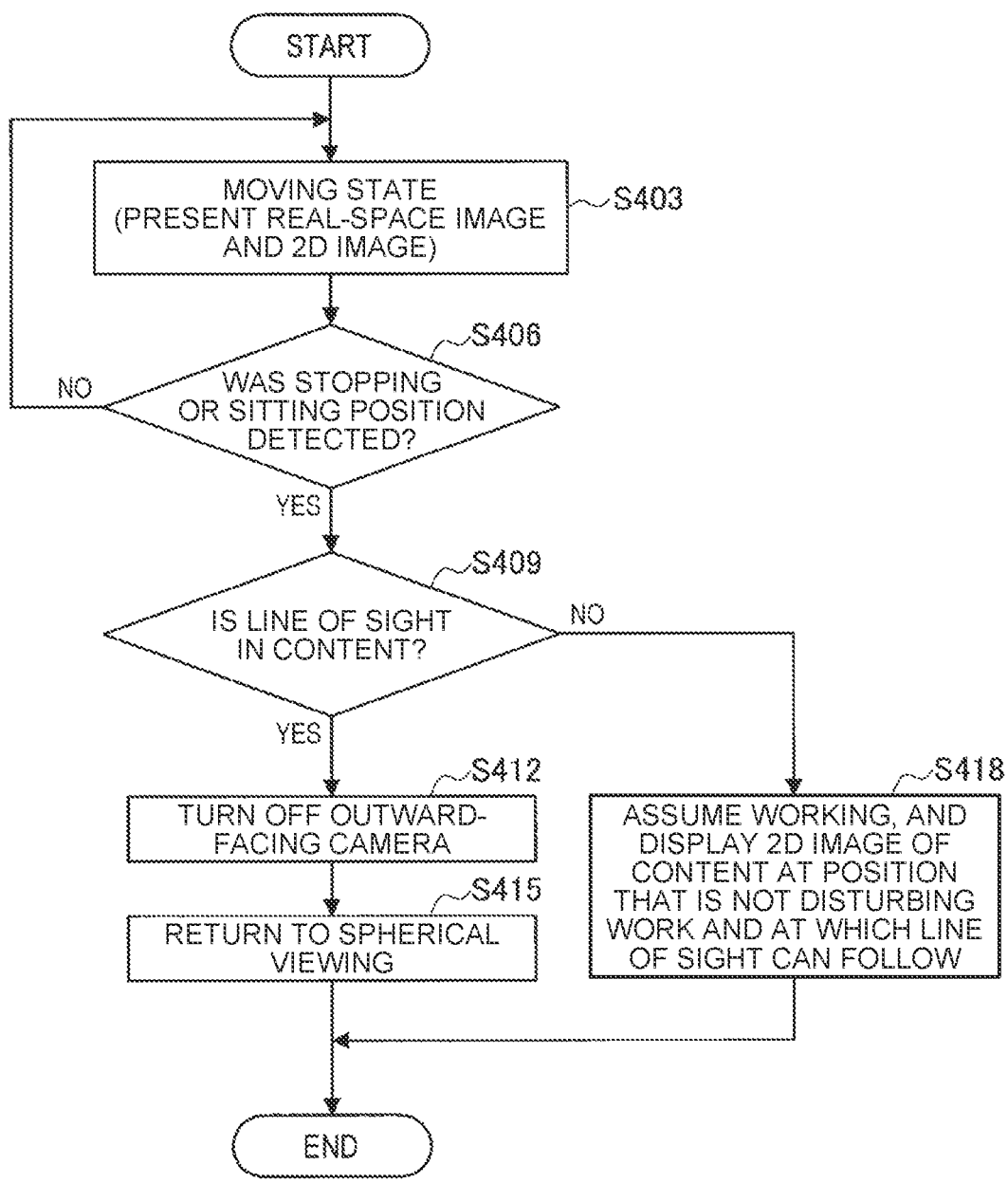
FIG. 11 is a flowchart illustrating one example of the flow of an operation process by a fourth example.

Subsequently, an operation process of returning to the viewing of the spherical image will be described with reference to FIG. 11. FIG. 11 is a flowchart illustrating the flow of an operation process by a fourth example.

As illustrated in FIG. 11, the display device 10 first determines, when detected stopping or a sitting position (Yes at Step S406) after being in a moving state (a state in which a real-space image and a 2D image are presented) (Step S403), whether the line of sight (gazing point) is in the content (2D image displayed in superimposition on the real-space image) (Step S406).

Next, if the line of sight (gazing point) is in the content (Yes at Step S409), the display device 10 turns off the outward-facing camera 130 (Step S412) and has control of returning to viewing the spherical image (Step S415).

On the other hand, if the line of sight (gazing point) is not in the content (No at Step S409), the display device 10 assumes that the work is being performed in the real space, and has control so that the 2D image of the content is displayed in a position that does not disturb the work and at which the line of sight can follow (Step S418).

3-5. Fifth Example

Furthermore, the display device 10 of the present embodiment is not only limited to the display control of the content but also can have control concerning the sound. For example, when the user is moving or working in the real space, because there is a need to hear the ambient sound, the display device 10 may continue the reproduction by reducing the volume of the content (2D image). Furthermore, when the AR representation of the sound is performed, this is stopped. When the reproduction of the content that is not real-time is stopped, the display device 10 also stops the sound. Conversely, when stopping the reproduction of the real-time content, only the sound may be reproduced in order to prevent overlooking.

Furthermore, while there is an important event or excitement, when the user is not watching the content (2D image), the display device 10 can, by warning with the sound and highlighting the excitement, achieve preventing overlooking.

The display device 10 may, when experiencing a virtual space such as viewing a spherical image, cancel the ambient sound because it is difficult to concentrate on the content when the ambient sound is heard. Alternatively, the display device 10 may adjust the speaker 160 so that the ambient volume is relatively small with respect to the volume of the content.

In this case, it becomes difficult for the user to notice the ambient sound, but it may be configured not to cancel the ambient sound that is a certain trigger (for example, a doorbell, a family call, and the like), for example. The general sounds can be registered in DB as cancellation-exclusion sounds, and the other sounds can be registered in advance by the user.

Furthermore, when the user rises and spontaneously moves, at the timing of turning on the outward-facing camera 130, the cancellation of the ambient sound may be stopped.

3-6. Sixth Example

Next, an example other than the viewing type content will be described. For example, in the case of communication-type content in which a plurality of people play a game in a virtual space, because it may be baffling when the other user (avatar and the like) suddenly stops moving or stops responding in the game, it may be configured to switch the content display and notify the communication partners of status.

Figure 12:
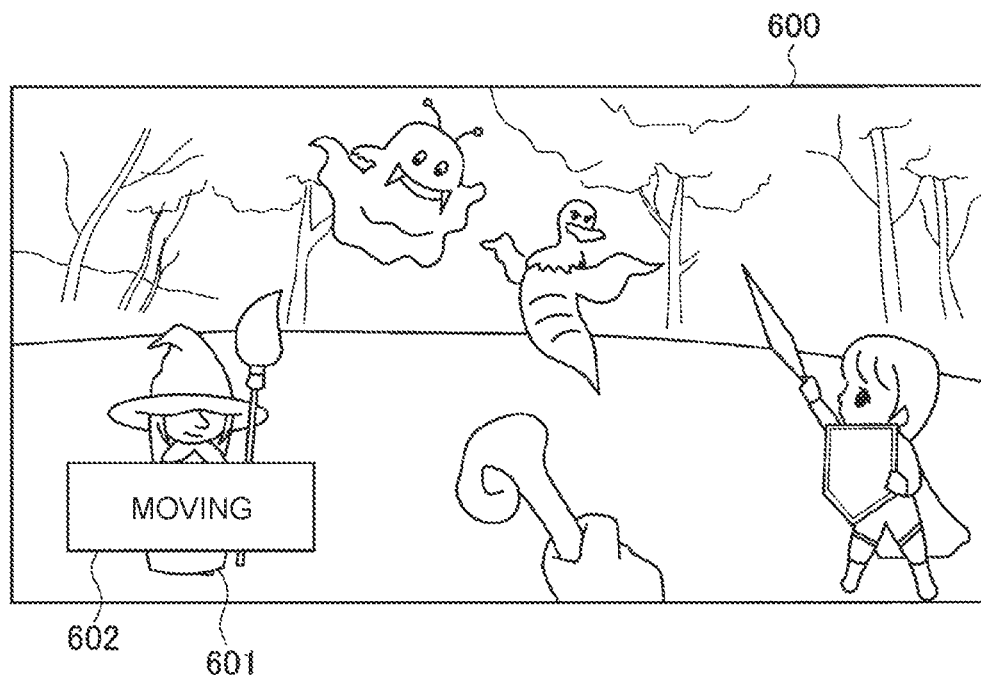
FIG. 12 is a diagram explaining one example of a user-status notification display for other users in a virtual space by a fifth example.

For example, when a standing position was detected in the case of a sitting game, or when a movement was detected in the case of a standing game, the display device 10 switches the display so as to display the real-space image on the background, turns a portion of the spherical image of the game screen into a 2D image and superimposes it on the real-space image, and disables the operation in the virtual space. As a result, when viewed from other users playing the game together in the virtual space, it is seen such that the avatar and the like of the relevant user suddenly stops moving or stops responding in the game. Thus, at this time, the display device 10 notifies the content server 20 of status (for example, "started moving", "moving", "suspended", "away from seat", and the like), so that, as illustrated in FIG. 12, in a game screen 600 (spherical image) the other users are viewing, a status notification image 602 such as "moving" is displayed on an avatar 601 of the relevant user. This allows the other users to intuitively understand that the relevant user is in the middle of moving or working in the real space.

Note that even during the 2D image display, it may be possible to respond to appeals from the virtual space. For example, the display device 10 may emphasize the appealing sound to the user.

Furthermore, even when the game is suspended due to a standing position or moving, the 2D image of the game that progresses in real-time is displayed around the gazing area and the like so as not to disturb the moving or working, so that the progress of the game can be grasped to some extent. Furthermore, when the game is resumed, high-speed reproduction (digest reproduction) may be performed. Furthermore, when the game is being suspended due to a standing position or moving, only the sound of the virtual space may be kept in a reproduction state.

Figure 13:
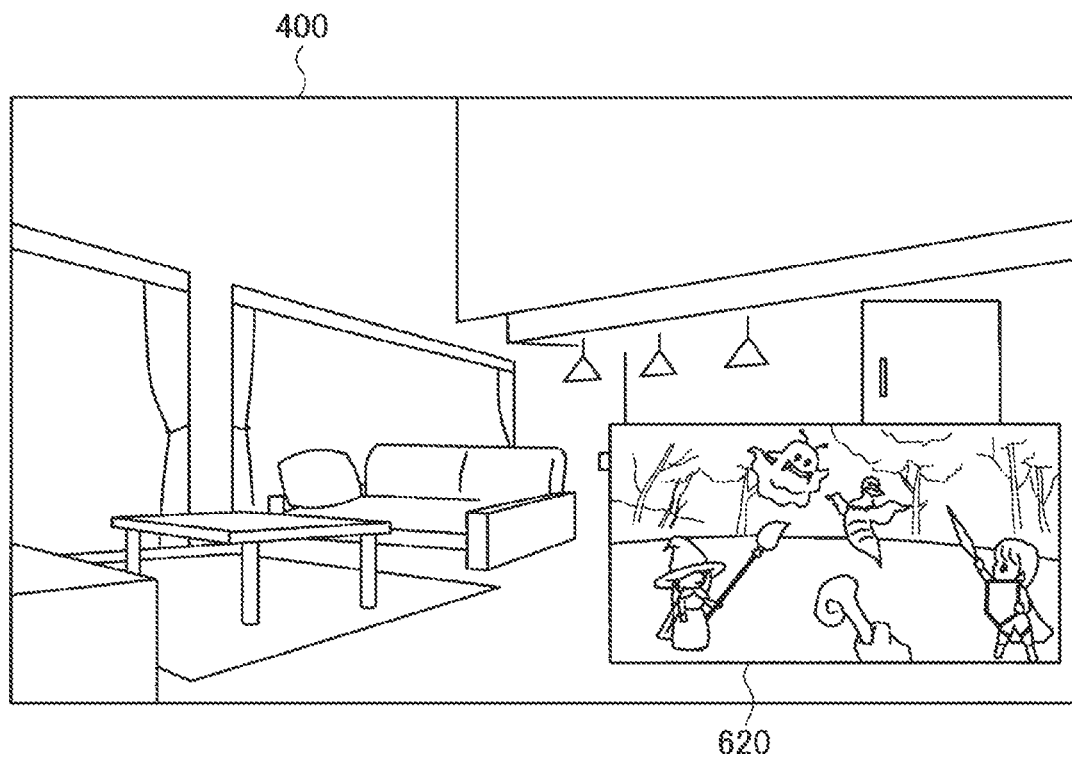
FIG. 13 is a display example of a 2D image by the fifth example.

In addition, even when switched to the display of the 2D image (when leaving the seat), operating the game may be allowed. FIG. 13 is a display example of a 2D image 620 by the present example. Because the controller is difficult to use while moving, the display device 10 may enable the operating input by touch gestures to the 2D image 620 illustrated in FIG. 13, or voice. However, because the erroneous operation to the 2D image 620 is likely to occur when the moving or working in the real space is involved, by combining voice recognition and gesture, activation may be performed by voice, or operation confirmation may be performed by voice. In addition, the line of sight and the gesture may be combined so that the operation can be performed only where the user is looking.

Furthermore, in the case of virtual space content (such as games) that assumes physical movement due to stepping and the like of the user, the display device 10 may regard a mere stepping motion or posture change as an operation of the content, and regard actual walking for a specific distance or more (for example, when acceleration in a specific direction is detected for a specific level or more) as detection of walking (moving) and secure the field of view needed for the moving (display the real-space image).

The display device 10 may, when moving out of a specific area set in advance such as leaving the room where viewing is taken place, suspend the content viewing and display the real-space image.

Furthermore, the display device 10 may, from the viewpoint of avoiding danger, always present the environment of the surrounding real space. For example, the display device 10 may make the places, which are likely to cause danger (stepping, bumping, and the like) such as below the feet, below the left and the right, and the like, always kept visible. Furthermore, the display device 10 may present the surrounding real-space environment, depending on the situation (dangerous conditions and the like).

4. OTHERS

The switching of the display according to the detection of a standing position or moving in the present embodiment is not limited to each of the above-described examples. The following describes some modifications.

For example, when the moving or working in the real space does not frequently occur, or when the moving is only within a specific range, the display device 10 may make the spherical image translucent and display the entire real-space image to be visible. At this time, the display device 10 may increase the transparency of the spherical image when there are many movements of the gazing point to objects in the real space, and conversely, when there are many gazing points in the spherical image, may reduce the transparency of the spherical image. The content is kept reproduced, and when the user stops or sits down, the translucency is canceled.

Figure 14:
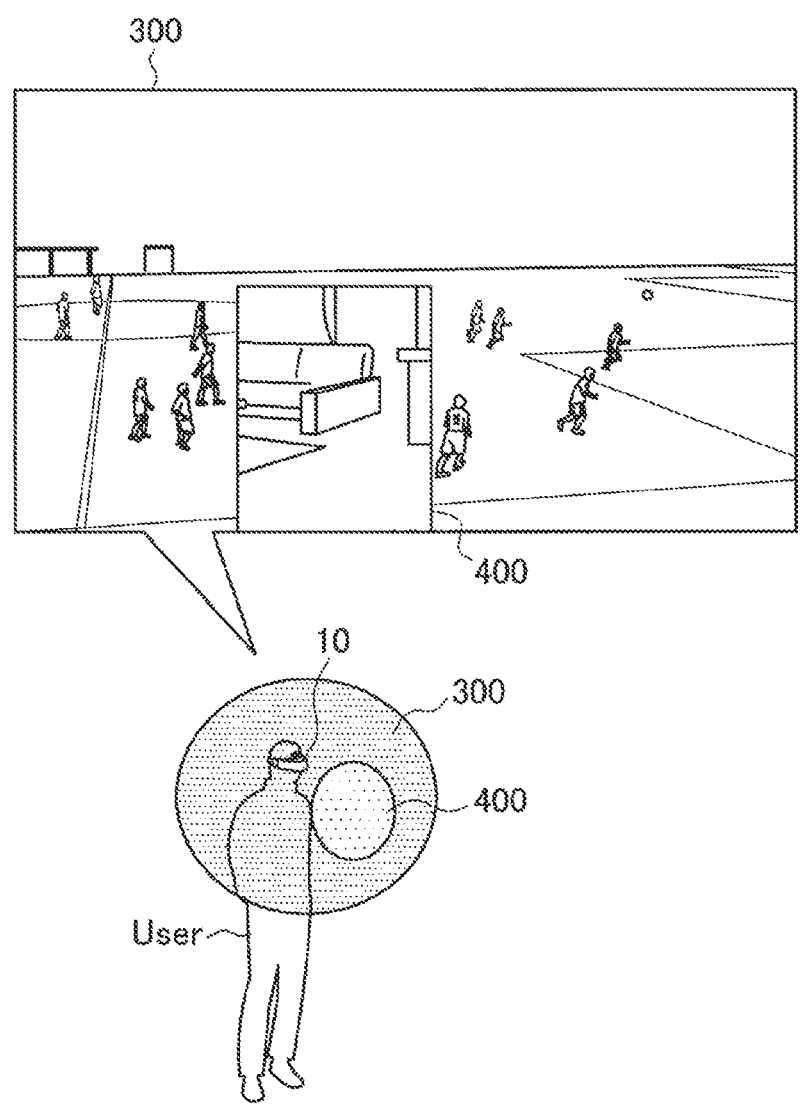
FIG. 14 is a diagram illustrating one example of a perforated display of the real space in the present embodiment.

Furthermore, the display device 10 may cut out a portion of the spherical image so that the real space is visible. FIG. 14 is a diagram illustrating one example of a perforated display of the real space in the present embodiment. As illustrated in FIG. 14, on a portion of a spherical image 300, the real-space image 400 is displayed so that it can be viewed. Where to make the perforation and the size of the perforation (display range of the real-space image) may be determined, for example, according to the distribution of the gazing point of the user's line of sight. For example, when the real space is being gazed at, the display device 10 may expand the display range of the real-space image.

Furthermore, the display device 10 may display the real-space image in the moving direction and, in the surrounding portions other than the moving direction, continue the reproduction of the content. Then, when the user stops or sits down, the perforated portion in the content that has been opened for securing the field of view in the real space is filled, and the reproduction of the spherical image is resumed.

Furthermore, the display device 10 may always fix the display position of the 2D image of the content such as below the front.

Figure 15:
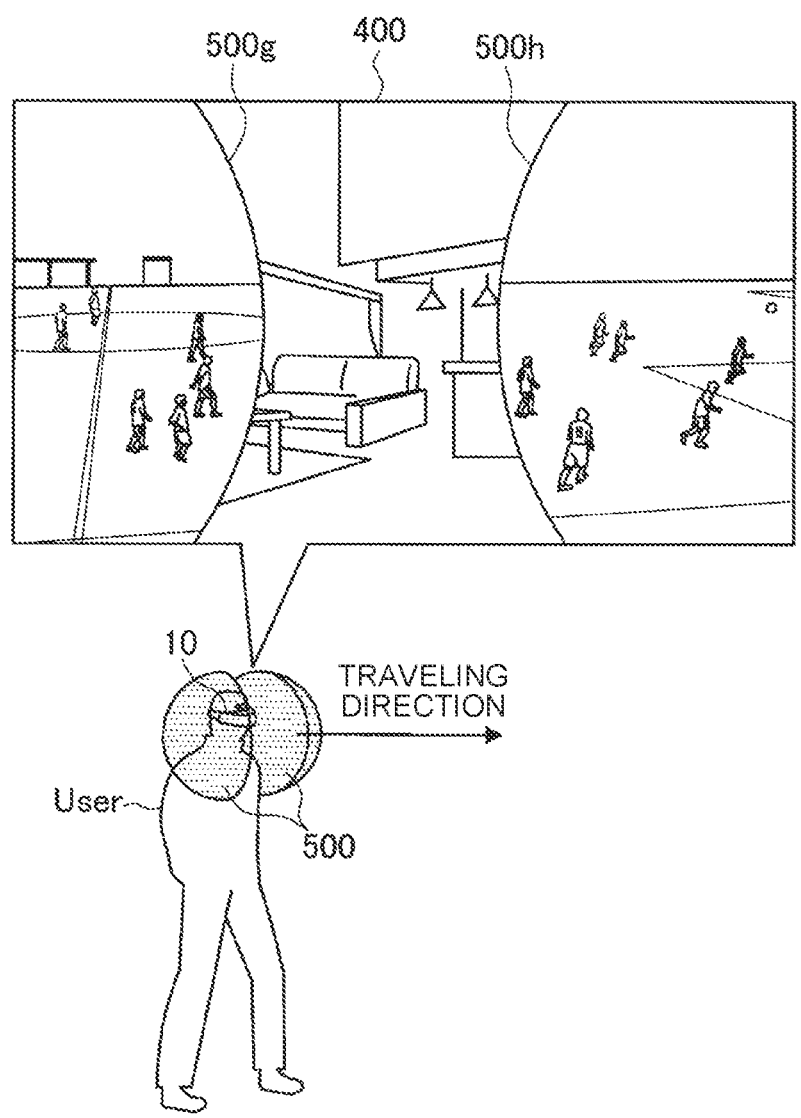
FIG. 15 is a diagram explaining a display example of a spherical image split up in a traveling direction in the present embodiment.

Furthermore, the display device 10 may, as illustrated in FIG. 15, perform display control so that the spherical image appears to be split up in the traveling direction of the user. In the example illustrated in FIG. 15, the image 500 (spherical image) is split up in the traveling direction of the user and is displayed on the left and the right respectively (2D images 500g, 500h).

As in the foregoing, in the present embodiment, it is possible to continue viewing at least a portion of the spherical image in the virtual space while securing the field of view in the real space.

5. SUMMARY

As just described, a preferred embodiment of the present disclosure has been described in detail with reference to the accompanying drawings, but the present technology is not limited to such examples. It is clear that anyone with ordinary knowledge in the technical field of the present disclosure may conceive various alterations or modifications within the scope of the technical ideas set force in the claims, and it is naturally understood that they belong to the technical scope of the present disclosure.

For example, it is also possible to create a computer program that exerts the functions of the display device 10 and the content server 20 on the hardware such as a CPU, a ROM, a RAM, and the like that are built into the display device 10 (information processing device) and the content server 20. In addition, a computer-readable storage medium in which the relevant computer program is stored is also provided.

The effects described herein are merely explanatory or exemplary but are not limited. That is, the technology according to the present disclosure may exhibit other effects apparent to those skilled in the art from the description herein, in addition to the above-described effects or in place of the above-described effects.

Note that the present technology can also take the following configurations.

(1)

An information processing device comprising a control unit configured to have control so that, when detected a status transition of a user including a rising motion or a moving motion of the user during reproduction of a wide-angle image covering an entire field of view of the user, a real-space image acquired by an outward-facing camera provided on a display device that is worn on a head of the user and has a display unit covering the entire field of view is displayed on the display unit in real-time and a 2D image corresponding to a portion of the wide-angle image is displayed on the real-space image.

(2)

The information processing device according to (1), wherein the control unit generates, as a 2D image, an image of a portion including a certain important area in the wide-angle image.

(3)

The information processing device according to (2), wherein the control unit generates, as the 2D image, an image of a portion further including a gazing area based on line-of-sight information on the user in the wide-angle image immediately before detecting the status transition.

(4)

The information processing device according to (1), wherein the control unit generates 2D images that transition from an image of a portion including a gazing area based on line-of-sight information on the user and a certain important area in the wide-angle image immediately before detecting the status transition to an enlarged image of the important area.

(5)

The information processing device according to (1), wherein the control unit generates 2D images that transition from a gazing area based on line-of-sight information on the user in the wide-angle image immediately before detecting the status transition to a certain important area.

(6)

The information processing device according to any one of (1) to (5), wherein the control unit controls a display position of the 2D image according to a moving direction when detected a moving motion of the user.

(7)

The information processing device according to any one of (1) to (6), wherein the control unit controls a power supply of the outward-facing camera to turn on when detected the status transition.

(8)

The information processing device according to any one of (1) to (7), wherein the control unit switches from a display of the 2D image to a display of a wide-angle image covering the entire field of view of the user on the basis of line-of-sight information on the user when detected a movement stop motion or a sitting position of the user.

(9)

An information processing method comprising controlling, by a processor, so that, when detected a status transition of a user including a rising motion or a moving motion of the user during reproduction of a wide-angle image covering an entire field of view of the user, a real-space image acquired by an outward-facing camera provided on a display device that is worn on a head of the user and has a display unit covering the entire field of view is displayed on the display unit in real-time and a 2D image corresponding to a portion of the wide-angle image is displayed on the real-space image.

(10)

A computer program that causes a computer to function as a control unit configured to have control so that, when detected a status transition of a user including a rising motion or a moving motion of the user during reproduction of a wide-angle image covering an entire field of view of the user, a real-space image acquired by an outward-facing camera provided on a display device that is worn on a head of the user and has a display unit covering the entire field of view is displayed on the display unit in real-time and a 2D image corresponding to a portion of the wide-angle image is displayed on the real-space image.

REFERENCE SIGNS LIST

10 DISPLAY DEVICE
20 CONTENT SERVER
100 CONTROL UNIT
101 POSTURE-INFORMATION ACQUISITION UNIT
102 MOVEMENT-INFORMATION ACQUISITION UNIT
103 LINE-OF-SIGHT INFORMATION ACQUISITION UNIT
104 CONTENT-IMPORTANT AREA IDENTIFICATION UNIT
105 DRAWING PROCESSING UNIT
110 COMMUNICATION UNIT
120 SENSOR UNIT
121 INWARD-FACING CAMERA
122 MICROPHONE
124 DIRECTION SENSOR
130 OUTWARD-FACING CAMERA
140 OPERATION INPUT UNIT
150 DISPLAY UNIT
160 SPEAKER
170 STORAGE UNIT

The invention claimed is:

1. An information processing device, comprising:
a control unit communicatively coupled to a display device, wherein the control unit is configured to:
detect a status transition of a user including a rising motion or a moving motion of the user during reproduction of a wide-angle image covering an entire field of view of the user;
receive, based on the detected status transition, a real-space image acquired by an outward-facing camera included in the display device, wherein
the display device is wearable-on a head of the user, and
the display device includes a display unit configured to cover the entire field of view;
generate a 2D image corresponding to a first portion of the wide-angle image based on content of the wide-angle image; and
control the display unit to display the 2D image on the real-space image at a display position based on a detected moving direction of the user.

2. The information processing device according to claim 1, wherein the control unit is further configured to generate, as the 2D image, an image of a second portion including a gazing area based on line-of-sight information of the user in the wide-angle image before the detection of the status transition.

3. The information processing device according to claim 1, wherein
the control unit is further configured to generate a plurality of 2D images that transition from an image of a second portion of the wide-angle image that includes a gazing area and the first portion before the detection of the status transition to an enlarged image of the first portion of the wide-angle image, and
the gazing area of second portion is based on line-of-sight information of the user.

4. The information processing device according to claim 1, wherein the control unit is further configured to generate a plurality of 2D images that transition from a gazing area based on line-of-sight information of the user in the wide-angle image before the detection of the status transition to the first portion.

5. The information processing device according to claim 1, wherein the control unit is further configured to control a power supply of the outward-facing camera to turn on based on the detection of-the status transition.

6. The information processing device according to claim 1, wherein
the control unit is further configured to control the display unit to switch from a display of the 2D image to a display of the wide-angle image covering the entire field of view of the user that is based on line-of-sight information of the user, and
the switch from the display of the 2D image to the display of the wide-angle image is based on detection of a movement stop motion or a sitting position of the user.

7. An information processing method, comprising:
detecting a status transition of a user including a rising motion or a moving motion of the user during reproduction of a wide-angle image covering an entire field of view of the user;
receiving, based on the detected status transition, a real-space image acquired by an outward-facing camera included in a display device, wherein
the display device is wearable on a head of the user, and
the display device includes-a display unit that covers the entire field of view;
generating a 2D image corresponding to a portion of the wide-angle image based on content of the wide-angle image; and
displaying, the 2D image on the real-space image at a display position on the display unit, based on a detected moving direction of the user.

8. A non-transitory computer-readable medium having stored thereon computer executable instructions, which when executed by one or more processors, cause the one or more processors to execute operations comprising:
detecting a status transition of a user including a rising motion or a moving motion of the user during reproduction of a wide-angle image covering an entire field of view of the user;
receiving, based on the detected status transition, a real-space image acquired by an outward-facing camera included in a display device, wherein
the display device is wearable on a head of the user, and
the display device includes a display unit that covers the entire field of view;
generating a 2D image corresponding to a portion of the wide-angle image based on content of the wide-angle image; and
displaying, the 2D image on the real-space image at a display position on the display unit, based on a detected moving direction of the user.

* * * * *